United States Patent [19]

Klotmann et al.

[11] Patent Number: 4,500,285

[45] Date of Patent: Feb. 19, 1985

[54] ARRANGEMENT FOR MOUNTING A BARREL RING ON THE CASTING OF A ROTARY CYLINDER

[75] Inventors: Fred Klotmann, Cologne; Hubert Ramesohl, Bergisch Gladbach, both of Fed. Rep. of Germany

[73] Assignee: Klöckner-Humboldt-Deutz AG, Fed. Rep. of Germany

[21] Appl. No.: 461,167

[22] Filed: Jan. 26, 1983

[30] Foreign Application Priority Data

Feb. 1, 1982 [DE] Fed. Rep. of Germany ....... 3203241

[51] Int. Cl.³ .................. F27B 7/00; D06F 58/00; F16C 13/00
[52] U.S. Cl. ..................................... 432/103; 34/108; 384/549
[58] Field of Search ............... 432/103; 308/204; 34/108

[56] References Cited

U.S. PATENT DOCUMENTS 3,384,356  5/1968  Durinck .................. 308/204
3,860,303  1/1975  Deussner ................ 308/204
4,320,586  3/1982  Korting .................. 432/103

FOREIGN PATENT DOCUMENTS 2853435  6/1980  Fed. Rep. of Germany .

Primary Examiner—J. Camby
Attorney, Agent, or Firm—Hill, Van Santen, Steadman & Simpson

[57] ABSTRACT

A rotary kiln construction wherein the kiln cylinder has an annular bearing ring for supporting the kiln in rotation with spacer plates located between the ring and the outer surface of the cylinder and circumferentially spaced from each other with supporting assemblies at each axial side of the bearing ring secured to the outer surface of the cylinder having retaining elements projecting on both circumferential sides of the plates and being radially outward of the plates to provide a radial inward support to the plate ends constructed for retaining the plates and for ease of replacement and removal without rewelding the full plate assembly on the cylinder.

12 Claims, 5 Drawing Figures

ARRANGEMENT FOR MOUNTING A BARREL RING ON THE CASTING OF A ROTARY CYLINDER

BACKGROUND OF THE INVENTION

The present invention relates to improvements in rotary cylinders for kilns, and more particularly to an improved structure for mounting an annular bearing ring on a rotary cylinder of a kiln.

In a rotary kiln construction, an annular bearing ring surrounds the kiln and is concentrically supported thereon with a plurality of circumferentially spaced lining, shim or spacing plates positioned around the cylinder circumference. Support structures are secured to the cylinder at circumferentially spaced locations on both axial sides of the bearing ring, and these support the spacing plates.

In the German patent application OS No. 2 853 435, an arrangement for the mounting of a bearing ring on a rotary cylinder is shown wherein the spacing plates which are disposed between the bearing ring and the outer surface of the rotary cylinder are retained in an axial direction on one axial side with movement arresting elements also secured on the rotary cylinder and the spacing plates. The end of the spacing plate on the other side, however, is not supported or protected in a radial direction so that during operation of the rotary cylinder, the spacing plate has movement in a radial direction and is rapidly damaged and destroyed. Despite various ways of supporting the plates, they all have been found to be wanting and do not supply the requirements of a rotary bearing cylinder.

Accordingly, an object of the present invention resides in providing an improved arrangement for mounting a bearing ring on the housing or outer surface of a rotary cylinder for a rotary kiln wherein the circumferentially separated spacing plates are secured so that movement in an axial as well as a radial direction is prevented.

A feature of the invention is to achieve the above objective by providing retaining elements for the spacing plates such that when viewed in a circumferential direction of the rotary cylinder, they support or brace the spacing plates by the spacing plates projecting beyond the support elements on both sides and wherein the spacing plates are supported or braced from above, that is, from a radial direction. With the improved structure which achieves support in a uniquely simple fashion, a reliable support and arresting of the movement of the spacing plates is effected in an axial as well as a radial direction and the service life of the spacing plates is substantially increased as contrasted with spacing plate support arrangements heretofore available.

In accordance with a further embodiment of the invention, the spacing plate is rectangularly designed and is provided on one end with a recess into which the support element engages. With this structure, the spacing plate can very advantageously be retained in position on the rotary cylinder housing, particularly when viewed in a circumferential direction, without providing special support or movement arresting elements.

According to a further feature of the invention, the spacing plates, viewed in a circumferential direction of the rotary cylinder, are located at a circumferential distance from each other. This provides for improved cooling of the bearing ring during operation of the rotary cylinder, but also the bearing ring and the spacing plates can be readily held and can be readily inspected from the side and the potential for damages can be immediately determined and eliminated.

A general objective of the invention is to provide an improved construction and support for circumferentially spaced spacing plates located between the annular outer surface of a kiln cylinder and an annular bearing ring which solves the problems unique to the rotation and support of the kiln cylinder and which attains improved operating life without losing the features of support and centering of the kiln and which provides for ease of assembly and construction and ease of repair in the event replacement should become necessary.

Other objects, advantages and features, as well as equivalent structures which are intended to be covered herein, will become more apparent from the teaching of the principles of the invention in connection with the disclosure of the preferred embodiment thereof in the specification, claims and drawings, in which:

DESCRIPTION OF THE PREFERRED EMBODIMENT

Figure 1:
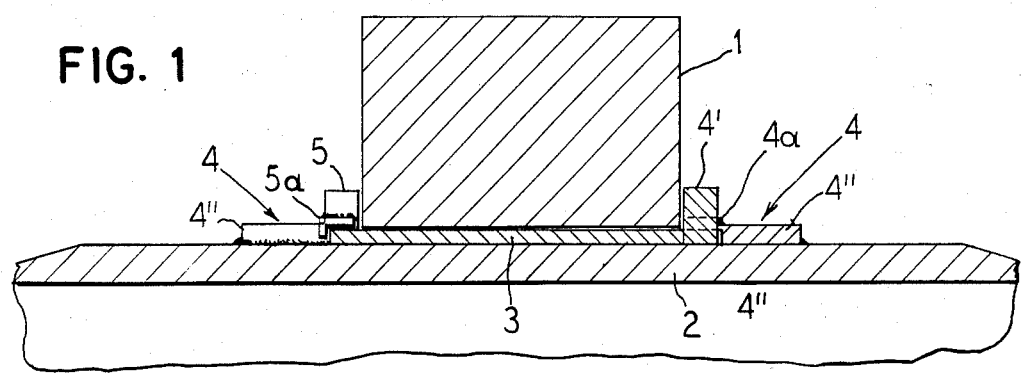
FIG. 1 is a radial sectional view taken parallel to the axis of a rotary kiln and showing details of the bearing ring and its support and taken substantially along line I—I of FIG. 2.
Figure 2:
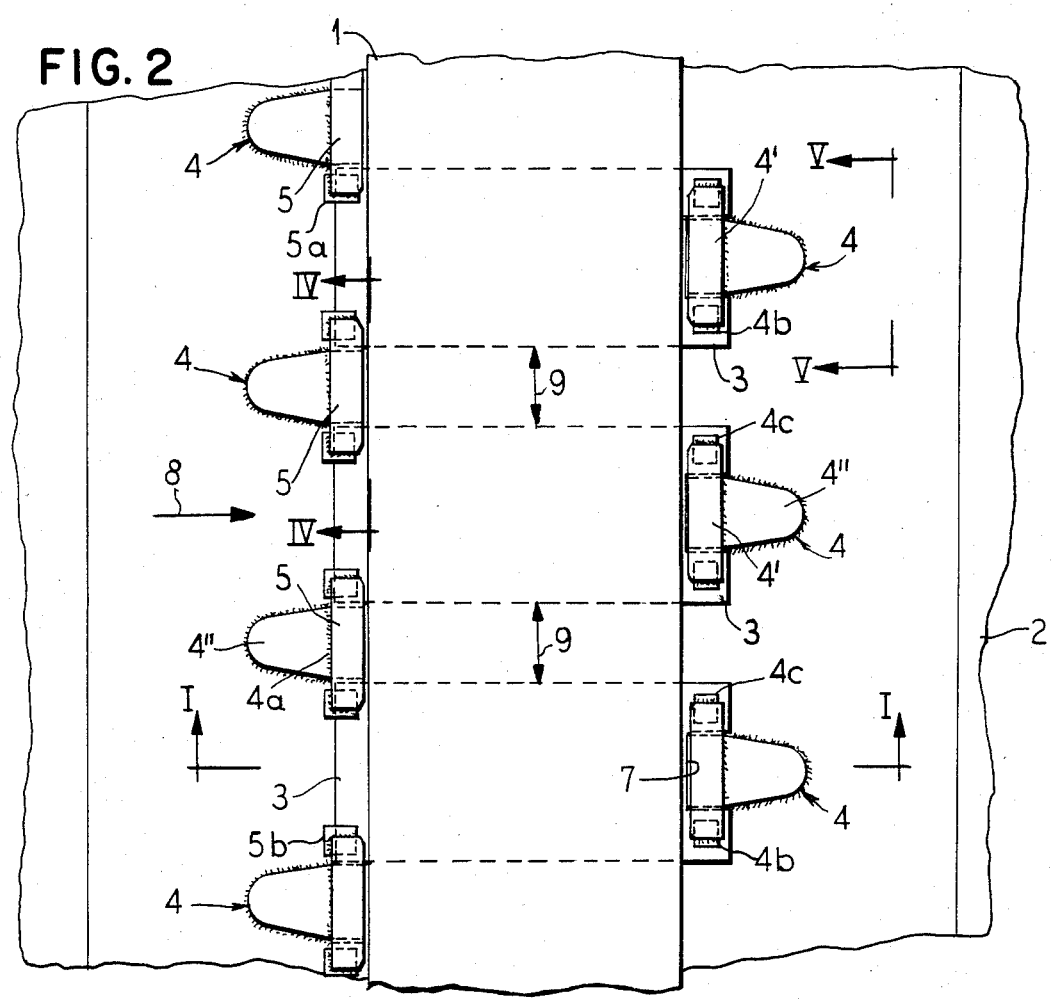
FIG. 2 is a fragmentary plan view of the rotary kiln showing the bearing ring in position and supported in accordance with the principles of the present invention.

FIGS. 1 and 2 illustrate a rotary kiln cylinder 2 which has for rotary support an annular bearing ring 1. The bearing ring is mounted concentrically on the rotary cylinder and is supported around the outer surface of the cylinder on a plurality of spaced lining or spacing plates 3 which are relatively loosely arranged for accommodating thermal expansion and operational forces.

On each of the axial sides of the bearing ring 1 are located support elements 4 which are welded onto the outer surface of the rotary cylinder casing 2. The support elements 4 are primarily uniformly spaced around the circumference of the casing 2 and are staggered or alternately arranged on each side of the bearing ring, and the support elements at the left side of the bearing ring in FIG. 2 are shown in detail in FIG. 4, and the support elements at the right side of the bearing ring in FIG. 2 are shown in detail in FIG. 5. The support elements 4 primarily serve to provide reliable support and mounting for the bearing ring in its predetermined position on the casing 2.

Figures 3, 4, 5:
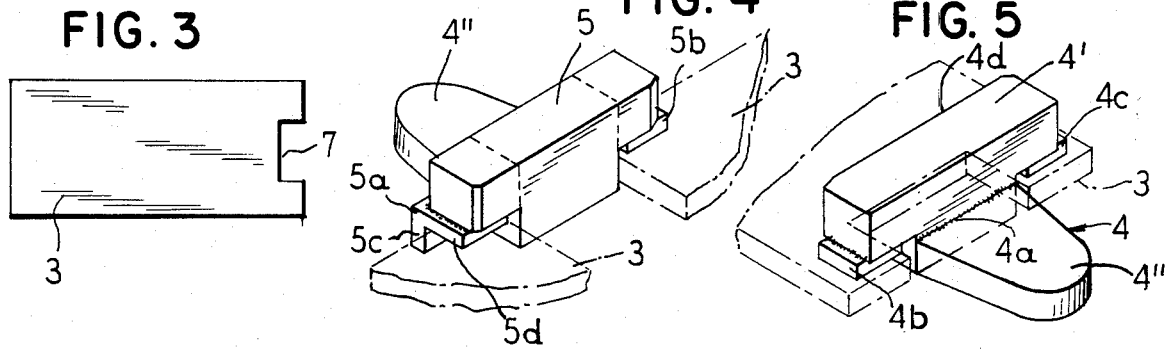
FIG. 3 is a detailed plan view of a spacing plate.
FIG. 4 is a perspective view of a bearing ring support with the view being taken substantially along line IV—IV of FIG. 1.
FIG. 5 is a perspective view of a bearing support with the view taken substantially line V—V of FIG. 2.

At the right side of the bearing ring as shown on the drawings, FIG. 1, FIG. 2, and FIG. 5, the support element includes two parts, a guide or an abutment strip 4' which abuts the side of the bearing ring. An attachment dog 4'' is welded onto the surface of the rotary cylinder, and the guide strip 4' is welded at its outer side onto the attachment dog 4''. In the event of wear of the guide strip 4', it can be removed by cutting the weld 4a and a new guide strip replaced for holding the bearing ring. A feature of this operation is that the weld 4a can be removed and a new guide strip 4' be welded in location without conducting welding operations on the bearing ring or on the cylinder casing 2. The guide strip 4' has welded beneath its lateral ends rectangular lugs 4b and 4c which press down on the top of the spacing plate 3. Thus, the spacing plate is held down by the lugs 4b and 4c of the abutment strip 4', and the strip 4' also provides lateral support for the bearing ring 1 by abutting it with the face 4d of the strip 4'. At the other side of the bearing ring, as shown in FIGS. 1, 2 and 4, an attachment dog 4" is welded onto the surface of the rotary cylinder, and mounted on the dog is a guide strip 5. The strip is T-shaped so that its base rests on the surface of the cylinder between adjacent spacing plates 3 thereby circumferentially holding the location of the spacing plates. Welded beneath the lateral ends of the guide strip 5 are small angles 5a and 5b. Each of these angles is constructed similarly, and as shown in the detail of 4a, a vertical leg 5c holds the end of the spacing plate 3 holding it axially, and a horizontal leg 5d presses on the top of the spacing plate holding it radially.

Through the retaining elements 4' and 5, the spacing plates 3 are securely retained in their position in the axial direction as well as the radial direction.

As illustrated in FIG. 3, the spacing plate 3 is rectangular in plan view and is provided with a rectangular recess 7 at one end. The spacing plate 3 during assembly is laterally inserted in the direction of the arrowed line 8 sliding it beneath the bearing ring 1. When in place, the end of the recess straddles the support lug 4 so that the depth of the recess solidly rests against the guide strip 4'. In this manner, a tooth-like engagement or relationship exists between the support lug 4 and the recess 7 of the spacing plate and the spacing plate is thereby securely retained in its position both axially and circumferentially.

Next, the retaining elements 5 and 4' are welded onto the support lugs 4 and thus the spacing plate 3 is securely retained in its axial as well as its radial direction. The spacing plates 3 are uniformly spaced from each other a distance shown at 9. This provides for improved cooling of the bearing ring permitting the circulation of air in the space between the plates 3. This also permits inspection of the bearing ring 1.

A further advantage is attained in that the spacing plates 3 are retained by virtue of the recess 7 at the circumferential spacing 9 which has been determined by the location of the support lugs 4. If the spacing plates are worn, they can be readily removed and interchanged from the left side of the bearing ring in the same manner in which they were originally inserted. In order to remove a worn spacing plate 3 and interchange it for a new nonworn plate, all that is required is the removal of the retaining elements 5 and 4'. Since the retaining elements are not mounted on the surface of the rotary kiln 2, but only on the support lugs 4, welding and joining work on the actual surface of the rotary kiln is avoided and not necessary.

Thus, it will be seen that we have provided a unique and improved support structure for a cylinder of a rotary kiln which meets the objectives and advantages above set forth and is uniquely designed to tolerate and operate with the heat and vibration and other operational factors which accompany kiln operation. While the structure is capable of a long operating wear, replacement and repair of the spacer plates and of the support lugs is easily and quickly accomplished without welding operation and inducing stresses into the cylinder casing.

We claim as our invention:

1. A rotary kiln construction comprising in combination:
   a rotary kiln cylinder having a cylindrical outer surface;
   an annular bearing ring for supporting the kiln in rotation and having an inner circumference larger than the outer circumference of the cylinder;
   a plurality of spacing plates located between the ring and cylinder and circumferentially spaced from each other; and
   support elements at each axial side of the bearing ring secured to the outer surface of the cylinder having retaining elements projecting on both circumferential sides of the plates and being radially outward of the plates to provide radial inward support to the plate ends.

2. A rotary kiln construction constructed in accordance with claim 1:
   wherein said spacing plates have a recess at one axial end and straddle the support elements for positively locating the plates in a circumferential direction.

3. A rotary kiln construction constructed in accordance with claim 1:
   wherein said spacing plates are spaced circumferentially from each other a uniform distance.

4. A rotary kiln construction constructed in accordance with claim 1:
   wherein said support elements include a dog welded to the outer surface of the cylinder and a retaining element engaging axially against the side of the bearing ring and attached to the dog by a weldment wherein the retaining element may be removed by removal of the weldment from the support dog without removal from the cylinder.

5. A rotary kiln construction constructed in accordance with claim 1:
   wherein said support elements include an annular member having the angle legs extending radially relative to the cylinder with one leg projecting radially to be axially outside of the plate.

6. A rotary kiln construction constructed in accordance with claim 5:
   wherein the support elements include a rectangular member radially outside of the plate secured to said one leg of the angular member.

7. A rotary kiln construction constructed in accordance with claim 1:
   wherein the support element includes a support dog welded to the outer surface of the cylinder and a guide strip axially between the ring and the support dog in abutting free engagement with the ring.

8. A rotary kiln construction constructed in accordance with claim 1:
   wherein the support elements include circumferentially spaced dogs at each side of the ring with the support dogs staggered so as to alternate in position at each side of the ring.

9. A rotary kiln construction comprising in combination:
   a rotary kiln cylinder having a cylindrical outer surface;
   an annular bearing ring for supporting the kiln in rotation having an inner circumference larger than the outer circumference of the cylinder;

a plurality of spacing plates located between the ring and the cylinder and circumferentially spaced from each other; and support elements at circumferentially spaced locations around the cylinder for maintaining the spacing plates in location and supporting the bearing ring axially, at least one of said support elements including a dog welded to the outer surface of the cylinder and a retaining element welded to the dog with said retaining element axially engaging the bearing ring and having means at each end for holding the spacing plates radially inwardly.

10. A rotary kiln construction constructed in accordance with claim 9:
wherein said support elements have means at each end for holding the spacing plates axially.

11. A rotary kiln construction constructed in accordance with claim 9:
wherein each spacing plate has a notch which straddles a dog and holds the spacing plate circumferentially.

12. A rotary kiln construction constructed in accordance with claim 9:
wherein the means at the end of the retaining element is in the form of an angle having one leg with a retaining surface facing axially and another leg with a retaining surface facing radially.

* * * * *